United States Patent Office 3,071,146
Patented Jan. 1, 1963

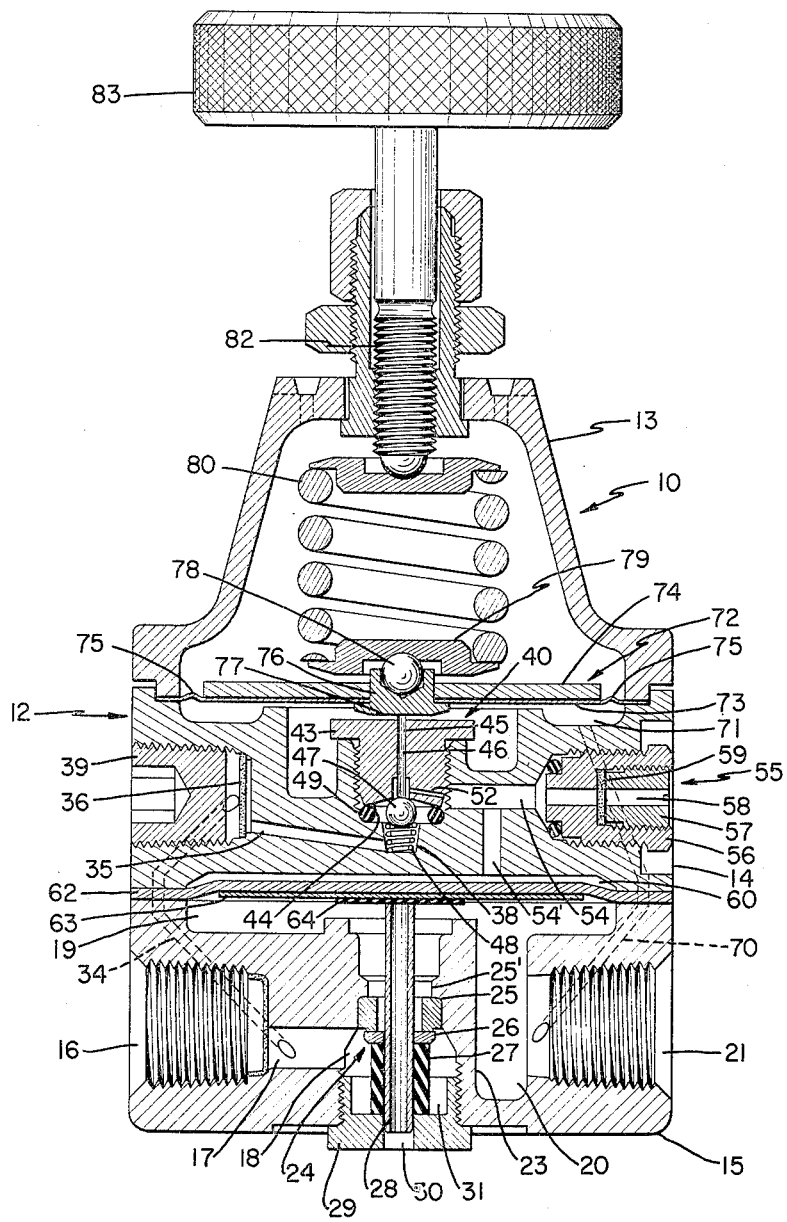

3,071,146
FLUID PRESSURE CONTROLLER WITH
RELIEF VALVE
Morley V. Friedell, Wheat Ridge, and Myron Dunn and
John Vander Horst, Denver, Colo., assignors to C. A.
Norgren Co., Englewood, Colo., a corporation of Colorado
Filed Mar. 20, 1961, Ser. No. 96,887
4 Claims. (Cl. 137—116.3)

This invention relates to a new and improved type of fluid pressure control embodying a number of features in construction and association of parts to establish close, accurate control in fluid pressure under variable conditions; more particularly, this invention relates to a fluid pressure regulating assembly which is capable of maintaining a substantially constant output pressure over a wide range of supply pressure and flow conditions.

Regulating valves and assemblies are commonly employed as a means of controlling fluid pressure into another unit, such as an air gauge; and, it is highly desirable to provide an extremely sensitive pressure controller capable of maintaining the output fluid pressure into the unit within narrow limits, notwithstanding wide variations in supply pressure. For this reason, it is also very desirable to devise an assembly which is very reliable and dependable in operation; yet, which enables close and accurate control of the output pressure over a wide range of selected pressures.

Additionally, the assembly of the present invention is designed to overcome a number of problems associated with rapid response due to sudden changes in pressure, freedom from drift normally related to the use of relatively heavy movable wall members, and effective relief within the assembly occasioned by sudden changes in pressure and extremely high pressure while isolating the means for relief from the supply pressure. Moreover, it is proposed to greatly simplify the entire installation while providing greatly increased sensitivity and response to changes in pressure and in such a way as to control the output pressure wholly independently of variations in the supply pressure, although utilizing the supply pressure as an effective medium for adjusting fluid flow.

Accordingly, it is an object of this invention to make provision for a high degree of sensitivity, stability and reliability in controlling fluid pressure, and moreover, to maintain the fluid pressure within narrow limits over a wide range of supply pressure and flow conditions.

It is another object to make provision for a pressure regulating means which is rapidly responsive and highly sensitive to variations in fluid pressure to compensate for any such changes in accordance with desired constant pressure levels to be maintained wholly independently of variations in supply pressure.

It is another object of the present invention to make provision for a close accurate means of controlling fluid pressure under the influence of a small quantity of the fluid being controlled while providing for rapid response and compensation for overpressure conditions attributable to sudden changes in pressure and extremely high pressures.

It is a further object to make provision for a pilot controlled, relief-type, pressure regulating assembly which is greatly simplified in construction, compact and which eliminates and overcomes a number of problems known to the art, while contributing materially to reliability, flow performance, and ease of manufacture.

It is a still further object of the present invention to provide for a highly sensitive, fluid pressure controller which is capable of imposing constant accurate control over a wide range beginning at zero gauge pressure, while nevertheless being capable of rapid response to large changes in pressure and extremely high pressure conditions.

The above and other objects of the present invention will become more apparent from the following detailed description, taken together with the single FIGURE of the drawing forming a part hereof in which there is illustrated, in section, a preferred form of fluid pressure controller, in accordance with the present invention.

Referring in detail to the drawing, there is shown in the preferred form a fluid pressure control assembly 10 which broadly consists of a body 12 made up of an upper casing or bonnet 13, an intermediate body portion 14 and a lower body or casing portion 15, the portions 13, 14 and 15 all being generally cylindrical in shape and also being symmetrical in exterior configuration about a vertical axis passing through the center of the assembly.

The lower body portion 15 is formed essentially to define an inlet opening 16 for connection to a suitable source of fluid pressure, and including a passage 17 leading into a valve chamber 18 located at the inner end of the passage; a generally dish-shaped space 19 is located above the chamber 18 and communicates with a vertically extending outlet space 20 which leads into an opening 21. The outlet opening 21 is formed for connection to some suitable instrument, such as an air gauge, not shown, and is preferably disposed in diametrically opposite relation to the inlet opening. An upstanding, generally circular wall 23 defines the chamber 18 and also contains a main valve designated generally at 24. The latter is comprised of a flat annular seat member 25 positioned against shoulder 25' in the outer wall 23, and a flat-surfaced annular valve element 26 which is urged against the seat by a flexible seal 27 thereby to function as a seal and valve return spring. The element 26 and seal 27 are mounted in tight-fitting relation on a relief tube 28 extending vertically through the chamber 18, a threaded plug 29 being positioned at the lower end of the tube for connection of the valve, seal and relief tube in desired relation in the chamber. The plug 29 is provided with a central bore 30 for reception of the tube 28 and an enlarged cavity 31 to receive the lower end of the seal 27 so that the seal is held firmly in place between the valve element 26 and plug 29. Inward threading and disposition of the plug 29 at the lower threaded portion of the valve chamber will act to compress the seal 27 and to exert a continuous force urging the valve element toward the seat.

Referring further to the construction of the main valve 24, the valve seat 25 is composed preferably of a chemically inert, resilient material for improved sealing and the contacting surface of the seat and valve element are made flat to permit the greatest possible flow area for a given displacement of the valve. In turn, the relief tube 28 is freely slideable in relation to the tube 28 and thus free to be compressed and elongated relative to the tube, but the main valve element is mounted in fixed relation on the tube so as to be centered and guided by the tube 28 as well as the seal 27 while being free to move into and out of engagement with the seat, depending upon the pressure differential between the inlet and outlet and flow demand. Accordingly, the valve construction forms an effective means of regulating fluid flow between inlet and outlet in order to control outlet pressure in accordance with selected pressure conditions imposed on the assembly in a manner to be described; also, the relief tube forms an important function as a means of guiding the main valve movement and in providing a sealed passageway as a part of a relief valve, to be described, in compensating for over-pressure encountered in the outlet section or downstream side of the assembly.

It will also be seen that the lower body portion 15 is formed with auxiliary passages communicating with the inlet and outlet openings, one passage forming a portion of what may be referred to as an inlet control passage 34 extending diagonally upwardly through the thickness of the lower body and through the lower portion of the intermediate body 14 into a lateral passage 35. A filter 36 is stationed at the entrance to the passage 35 in order to remove any foreign particles from the fluid, and the passage 35 in turn leads into a pilot valve chamber 38. The filter 36 is pressed into place and the chamber is sealed from the atmosphere by a plug 39, and the latter is recessed to receive a suitable wrench or tool for positioning of the plug in place.

A pilot valve 40 is designed to control the capacity and pressure of fluid flowing from the inlet opening through the pilot valve for a purpose to be described, and essentially includes the chamber 38, a cylindrical plug 43 having a generally concave seating surface 44 and a central vertical opening or passage 45 of limited area for reception of a needle-like valve stem or pin 46. A valve 47, preferably of spherical configuration, is positioned at the lower end of the seat and is urged against the seat by means of a spring 48, and a seal 49 is shown interposed between the bottom of the seat portion and the intermediate body 14. At the lower end of the plug 43, adjacent the seating area for the valve 47, the vertical opening 45 is somewhat enlarged and communicates with a lateral passage 52 so that when the valve stem 46 is moved downwardly to force the valve 47 away from the seating area fluid will be free to flow upwardly, then laterally through the passage 52 into an outlet chamber 54. Actually, the construction of the pilot valve is considered to be one novel feature of the present invention, in that the pin or valve member 46 operates very effectively without the use of a seal of any type and assures proper fluid control merely through the use of commercial tolerances, finishes and fits. The latter is made possible due to its small size and also the very small differential pressure existing across the leakage path. In fact, any minor leakage along the length of the valve acts as a lubricant to ease its operation.

Projecting into the outlet chamber 54 is a bleed screw assembly 55 made up of inner and outer concentric threaded plug members 56 and 57 together providing a central bore 58 aligned with the chamber 54, and a disc 59 of porous, flexible material is squeezed between the concentric plugs for extension across the bore 58 to form an adjustable bleed opening between the outlet chamber 54 and the atmosphere. Adjustment of the bleed opening is achieved by means of the threaded element 57 which controls the permeability of the porous disc 59 by crushing it until the desired permeability is obtained. In this way, the bleed screw construction is less susceptible to clogging than conventional orifices, and requires less stringent manufacturing tolerances.

Also communicating with the outlet chamber 54 is a vertical passage 54' that leads downwardly into a main control chamber defined by an inverted dish-shaped space 60 formed in the bottom surface of the intermediate body 14 and mating with the upper space 19 on the top surface of the lower body 15. This is divided into the separate spaces by a single-walled flexible diaphragm 62 interposed between the body portions 14 and 15, and the diaphragm 62 has secured to its bottom surface a rigid plate 63 and a flat resilient seal strip 64 of limited area which with the diaphragm define a movable wall. The seal strip 64 is centered on the plate 63 to abut against the open end of the relief tube so as to form the relief valve on the outlet side of the main valve 24.

The other control passage extending through the lower body portion communicates with the outlet side of the main valve and forms what may be referred to as an outlet control passage 70 extending upwardly through the lower body and completely through the intermediate body portion into a sensing chamber 71. The latter is formed by mating recess portions in the upper casing and top of the intermediate bodies 13 and 14, respectively, and has a pilot diaphragm 72 which is most preferably constructed of a thin metal sheet portion 73 extending horizontally across the sensing chamber and is supported by a relatively thick metal disc 74. The metal disc, as seen, is of a smaller diameter than the metal sheet to permit formation of an annular movable area of inverted V-shape as at 75; the vertex of this V-shaped annular area is given as small a radius as possible so that the effective diameter of the entire diaphragm will be that of the vertex itself and will change very little with diaphragm motion. In this way, it is possible to provide a sensing member within the chamber which will undergo the necessary motion to control the pilot valve movement while exhibiting minimal change in effective area, together with extreme flexibility and strength. Also, forming a part of the entire sensing unit along with the diaphragm 72, is a central block 76 inserted through the center of the diaphragm with its bottom surface 77 made flat and parallel to the top surface of the seat 44 of the pilot valve. It will be seen that the member 76 will actually move into engagement with the pin 46 to control its movement through the passage 45 against the spherical valve 47. Similarly, a spherical member 78 is positioned atop the member 76 and is engaged by a cap 79 at the lower extremity of a regulating spring 80 which, by manipulation of an adjusting screw 82 and handle 83, controls the initial setting of the entire sensing unit. The construction of the adjusting screw and regulating spring are well known and of conventional form, so will not be described in detail except to point out their function in relation to the entire assembly.

The operation of the assembly is as follows: Assuming that fluid under pressure is supplied to the inlet, its flow through the outlet will be controlled by the main valve member 24, thereby to develop a predetermined downstream pressure as determined by the initial spring 80 and adjusting screw 82 setting. The effect of the spring 80 on the operation of the main valve 24 will be seen from various typical examples of variations in pressure on the downstream side of the assembly. Assuming that the pressure slips below the set pressure, initially the spring 80 will overcome the force exerted on the diaphragm 72, due to the reduced pressure of the fluid in the sensing chamber 71, since this chamber communicates with the downstream side through the passage 70 and therefore would have the same pressure throughout. In turn, the head portion 76 of the sensing unit will force the pin 46 downwardly, further opening the pilot valve 40, and as a result, the increase in flow of fluid from the inlet side 16 through the pilot valve will act to increase the pressure in the control chamber 60 to a new pressure level. This increase in pressure will, in turn, act on the movable wall 62, forcing the relief tube 28 downwardly against the combined force of the seal 27 and the inlet pressure somewhat, thus increasing the flow of fluid between the inlet 16 and outlet space 20 to effect a corresponding increase in downstream pressure. As the flow increases through the pilot valve, in conjunction with the initial setting of the bleed screw 55, a new equilibrium pressure is established in the chamber 60.

In the event the downstream pressure becomes greater than the selected pressure, the reverse operation will be seen to result: Here, the sensing diaphragm 72 will be forced upwardly due to the increased pressure in the sensing chamber, the pilot valve spring 48 will urge the valve 47 upwardly against the pin 46 so that the fluid flow from the inlet 16 through the pilot valve will decrease, and the pressure in the control chamber 60 will correspondingly decrease until the flow through the bleed screw assembly 55 again is in equilibrium with that through the pilot valve. The decreased pressure in the control chamber again allows the diaphragm 62 to rise, it being forced upwardly by the greater pressure in the lower space 19 thereby to allow the seal 27 to move the valve element 26 toward the seat to limit fluid flow therethrough from the inlet to the outlet. If the set pressure is not reached by the time the main valve becomes closed, the continuing pressure decrease in control chamber 60 will allow the wall to continue to rise so as to lift the relief valve 64 from the valve stem 26 and permit escape of fluid from the outlet space 20 through the valve stem and relief passage 30. Accordingly, the relief valve arranged in association with the main valve and movable wall will assist in arriving at the desired pressure on the downstream side. Similarly, a sudden pressure surge on the downstream or outlet side of the valve will initiate the same action in the relief valve, since a sudden surge would act directly against the diaphragm 62 operating to lift it and to vent excess fluid through the passage 30 so as to return the pressure rapidly to the set level.

Where sudden changes in fluid flow conditions in the outlet are encountered, which occurs for instance in air gauging, the unit will operate in the following manner: As the flow demand suddenly decreases, there would be initially an excess flow of fluid into the outlet chamber, thus increasing downstream pressure possibly beyond that required. If such occurs, this increase in pressure would be transmitted from the space 20 through passage 70 to the sensing chamber 71 where it would overcome the force exerted by the spring 80 and lift the diaphragm 72. In moving upward, the diaphragm would permit the pilot valve spring to partially close the valve, and, in cooperation with the bleed screw assembly 55, would reduce the fluid pressure in the control chamber 60 thus allowing the diaphragm 62 to move upwardly and the main valve to move toward its closed position by the combined action of the supply pressure and the main valve spring 27. This action would continue until the position of the main valve is such that it passes a required rate of flow in accordance with the pressure condition.

If outlet pressure demand suddenly increases, again the reverse would occur where the main valve opening would be momentarily insufficient to move the desired flow and pressure. Accordingly, the pressure in space 20, passage 70 and control chamber 71 would drop, allowing the spring 80 to move the diaphragm 72 downward so as to increase the opening of the pilot valve for flow of fluid from the inlet 16 into the control chamber 60. As the pressure in the control chamber increases, it would of course force the diaphragm 62 downward to increase the main valve opening until flow and pressure equilibrium are again obtained. In general, since the volume of fluid contained in the chamber 60 and passage 58 is very small, its pressure may be changed rapidly in either direction by the combined action of the pilot valve and the fixed restricted opening as defined by the orifice 55.

Reference is again made to the relief valve construction, which is associated with the main valve as it forms a principal feature of the present invention. Again, it will be noted that through the disposition of a flexible seal between the valve element and the plug in the lower body portion, it is possible to seal between inlet pressure in the opening 16 and atmospheric pressure in the relief tube.

It will be evident that various alternative forms of relief valve constructions may be utilized in the lower body without affecting the construction of the sensing and pilot control units in the upper casing 13 and intermediate body 14. However, the relief and main valve arrangement of the preferred form accomplishes improved sealing throughout and smooth, quiet operation along with the elimination of parts. In overall construction and operation, it will also be seen that the subject invention is unique among pilot operated, fluid pressure assemblies of the relief type in making provision for use of a single main diaphragm as opposed to double diaphragms of somewhat bulkier construction. Also, the subject invention utilizes for control a small quantity of the fluid being controlled which is directed from the inlet side of the main valve for pilot operation of the main valve under control of the pilot valve 40 and the fixed restriction 55.

In this way, pressure control may be initiated at zero gauge pressure since the control is in no way dependent upon flow of fluid through the main valve; thus, even though the main valve may be completely closed, changes in pressure conditions on the outlet side will permit the supply fluid to flow through the pilot valve for controlling the movement of the diaphragm 62 against the main valve. In this relation, it is also to be noted that the present invention eliminates the necessity for a differential area-type diaphragm, since the fluid flowing through the pilot valve can vary in pressure from zero to substantially the supply pressure and thus not require compensation by a differential area on opposed sides of the diaphragm.

As hereinbefore described, the manner of construction of the sensing unit, especially the diaphragm 72, along with the construction of the pilot valve and bleed screw, offers a number of improvements in sensitivity and accuracy of control. In combined operation, it will be noted that the sensing unit is formed in such a way that its action is carried through the exact center thereof by means of the spherical member 78, to cause an exact corresponding movement of the pin 46, also of limited size and located centrally in exact alignment with the spherical member 78. In this relation, beginning with the sensing unit, acting through the pilot control valve on the diaphragm 62, the later in turn actuating the main valve through the valve member 64, all actuating parts are coaxially aligned with one another and where the action takes place in a very limited area along the vertical axis of the assembly, thus achieving unusually close control over the pressure. Accordingly, not only the elements as individually constructed, but also their cooperative association, is believed to be particularly unique in the formation of a pressure regulating assembly which will accomplish closest regulation over downstream pressure and actually maintain it within narrow limits of control.

From the foregoing, it is to be understood that a number of changes and modifications may be made in the construction and operation of the present invention without departing from the scope thereof, as defined by the appended claims and reasonable equivalents.

What is claimed is:

1. A fluid pressure controller for maintaining a predetermined outlet pressure comprising: a body including inlet and outlet openings, a combination main valve and relief valve assembly disposed in said body to control fluid flow between the inlet and outlet, said assembly including a main valve chamber between said inlet and outlet, a plug closing one end of the chamber with a bore passing therethrough to the atmosphere, a flat surfaced annular valve seat disposed in the chamber in spaced facing relation to said plug, a tubular relief valve extending through said chamber in spaced relation to said valve seat and having one end disposed in slidable relation in the bore, an annular valve element on said relief valve and a flexible seal interposed between said valve element and said plug normally urging said valve element against said seat while sealing said relief valve at all times from inlet pressure, and a flexible diaphragm abutting against one end of said relief valve opposite said plug, said diaphragm being subject on one side to pressure in the outlet opening and on the other side to inlet pressure so as to control movement of said main valve element in relation to said seat according to the differential pressure between the inlet and outlet.

2. A fluid pressure controller according to claim 1 in which said diaphragm is normally sealed against the one end of said relief valve and is movable away from said relief valve under sudden increases in outlet pressure thereby to permit communication between the outlet opening and atmosphere.

3. A fluid pressure controller according to claim 1 in which said annular valve seat is composed of a resilient material.

4. A fluid pressure controller for maintaining a predetermined outlet pressure comprising a body including inlet and outlet openings, a combination main valve and relief valve assembly disposed in said body to control fluid flow between the inlet and outlet, said assembly including a main valve chamber between said inlet and outlet, a valve seat disposed in the chamber and a tubular relief valve extending through said chamber and through said seat but in spaced relation to said valve seat, one end of said relief valve communicating with the atmosphere, a valve element on said relief valve and a flexible seal normally urging said valve element against said seat while sealing said relief valve at all times from inlet pressure, and a flexible diaphragm abutting against the other end of said relief valve, said diaphragm being subject on one side to pressure in the outlet opening and on the other side to inlet pressure so as to control movement of said main valve element in relation to said seat according to the differential pressure between the inlet and outlet.

References Cited in the file of this patent

UNITED STATES PATENTS

| | | |
|---|---|---|
| 2,583,006 | Nieseman | Jan. 22, 1952 |
| 2,703,582 | Stephanian | Mar. 8, 1955 |
| 2,761,464 | Faust | Sept. 4, 1956 |
| 2,764,996 | Brown | Oct. 2, 1956 |